Nov. 2, 1965     H. J. SCHWERDHÖFER     3,215,002

DUAL SPEED HUB

Filed July 12, 1962     3 Sheets-Sheet 1

INVENTOR

Hans Joachim Schwerdhöfer

Nov. 2, 1965   H. J. SCHWERDHÖFER   3,215,002
DUAL SPEED HUB
Filed July 12, 1962   3 Sheets-Sheet 2

INVENTOR
Hans Joachim Schwerdhöfer
By Richard Low
Agt

Nov. 2, 1965     H. J. SCHWERDHÖFER     3,215,002
DUAL SPEED HUB

Filed July 12, 1962     3 Sheets-Sheet 3

INVENTOR
Hans Joachim Schwerdhöfer
BY Richard End
Agt

United States Patent Office 3,215,002
Patented Nov. 2, 1965

3,215,002
DUAL SPEED HUB
Hans Joachim Schwerdhöfer, Schweinfurt (Main), Germany, assignor to Fichtel & Sachs A.G., Schweinfurt (Main), Germany, a corporation of Germany
Filed July 12, 1962, Ser. No. 209,457
Claims priority, application Germany, July 13, 1961, F 34,423
4 Claims. (Cl. 74—750)

This invention relates to a dual speed hub for the driven wheel of bicycles, motorcycles, and the like, and more particularly to a hub which includes two optionally usable motion-transmitting elements or groups of elements and back pedaling speed control.

In known dual speed hubs, motive power is transmitted from pedals or an engine to a sprocket wheel which is fixedly connected to a driver member rotatable about a stationary hub shaft secured to the bicycle frame. The driver member is partly enveloped by a hub shell. A portion of the driver member projects from the hub shell and carries the sprocket wheel over which a drive chain is trained. The driver member extends between the sprocket wheel and planetary gearing means which consist essentially of a sun wheel, a planet wheel carrier, and planet wheels. The planetary gearing transmits rotary motion of the driver member to the hub shell. Wire spokes on the hub shell carry the rim of the driven bicycle wheel. The hub to which the present invention relates includes further two elements or groups of elements for optional transmission of power to the hub shell.

The primary object of my present invention is to generally improve dual speed hubs for bicycles, motorcycles, and the like. The hub of the invention provides a wheel speed equal to the input speed of the hub or a speed higher or lower than the input speed.

Other objects of the invention center about a hub with or without a coaster brake, two optionally usable power-transmitting elements, and a back pedaling speed change arrangement.

Further objects will be apparent from the following description.

The specification is accompanied by drawings which show by way of examples a number of embodiments of the invention and in which.

Figure 8:
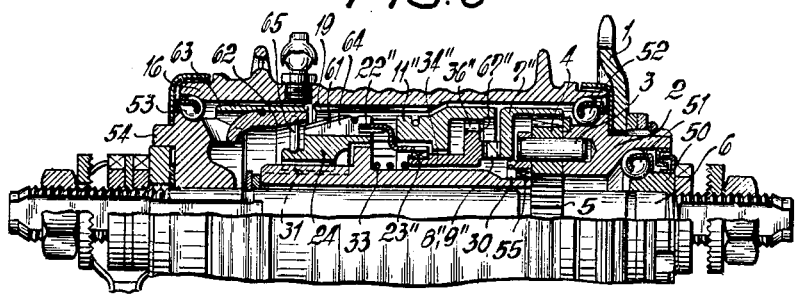
Figure 9:
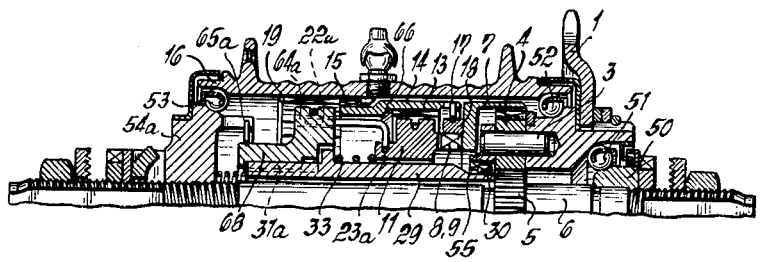
Figure 10:
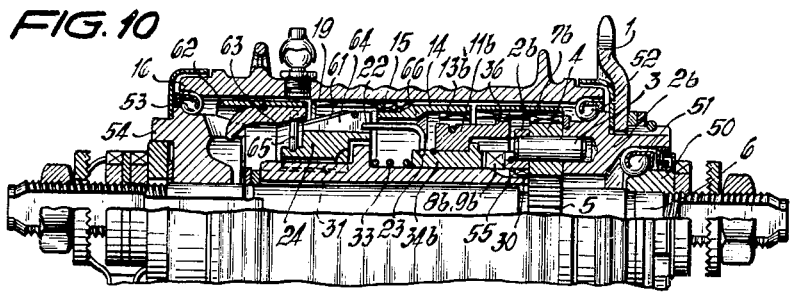
Figure 11:
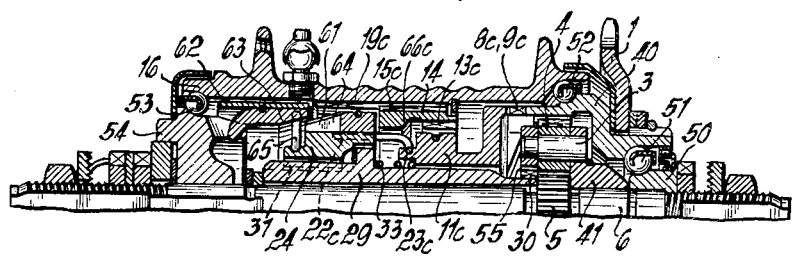
Figure 12:
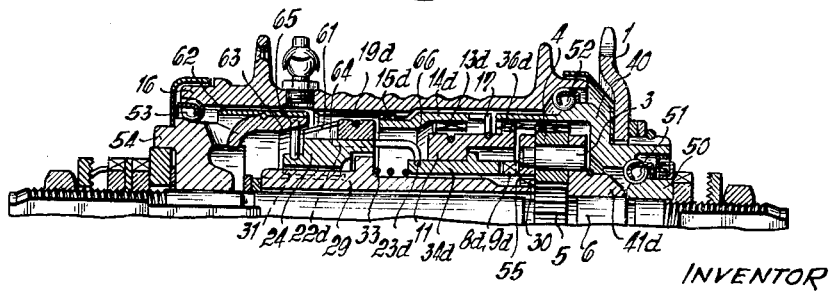

FIG. 8 shows a third embodiment;
FIG. 9 shows a fourth embodiment;
FIG. 10 shows a fifth embodiment;
FIG. 11 shows a sixth embodiment; and
FIG. 12 shows a seventh embodiment.

Figure 1:
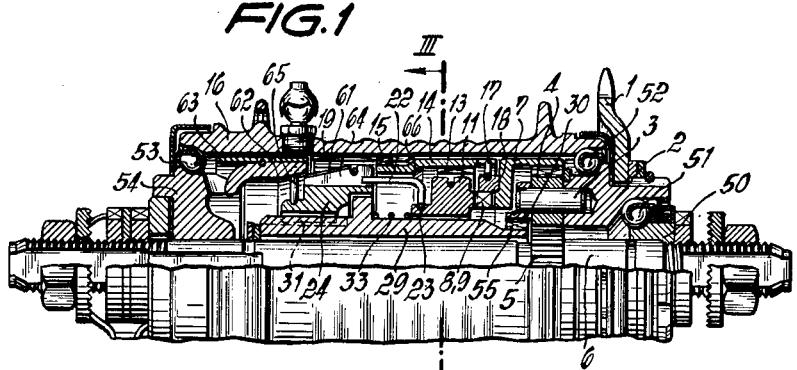
FIG. 1 is a longitudinal section through one half of a hub embodying features of the invention, the section being taken in an axial plane.

Referring to the drawings in greater detail now, and initially to FIG. 1, there is shown a rear wheel hub of a bicycle to which the wheel rim is to be secured by a multiplicity of wire spokes in conventional manner. The working elements of the hub are mounted on a stationary shaft 6 adapted to be clamped in a fork of the bicycle frame. Most of the movable hub elements are enveloped by a hub shell 16 which extends coaxially with the shaft 6. The shaft carries two axially spaced bearing members 54, 50 which provide inner races for ball bearings 53 and 51, respectively. An end portion of the hub shell 16 forms the outer race for the ball bearing 53. A tubular driver member 2 fixedly fastened to a drive sprocket 1 rotates on the ball bearing 51 and, in turn, rotatably supports by means of an interposed ball bearing 52 the end of the hub shell remote from the aforesaid hub shell end portion.

In the embodiment shown in FIG. 1, the transmission includes a planetary gearing within the hub shell 16. The driver member 2 supports bearing pins 3 which carry planet wheels 4. Thus, the driver member 2 serves also as a planet wheel carrier. The planet wheels mesh simultaneously with a sun wheel 5 fixed on the shaft 6 and an internal gear rim of a cup-shaped wheel or ring gear 7.

Figure 5:
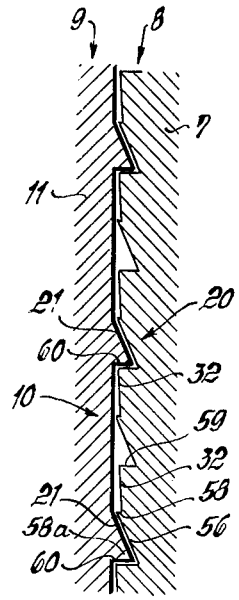
FIG. 5 is explanatory of the position of two toothed faces in the position of FIG. 1 or in driving engagement.

As can be seen from FIG. 5, the ring gear 7 has a face 8 having teeth 20 cut therein, which teeth comprise an ascending face 56, a tip 58, a dwell 32, and a descending face 59.

Figure 3:
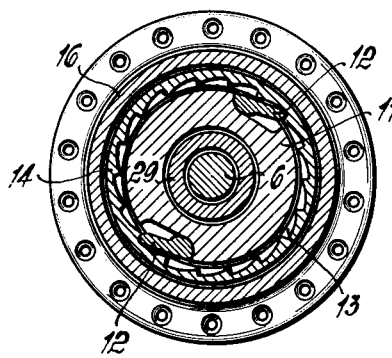
FIG. 3 is a section taken in the plane of the line III—III of FIG. 1.

The shaft 6 carries a drive sleeve 29 which is provided with an external gear rim 30 to engage an internal gear rim 55 of the driver member and planet wheel carrier 2. Rotatably mounted on the drive sleeve 29 is a pawl carrier 11 provided with pawls 12 (see FIG. 3). The pawls 12, under the influence of an annular spring, engage a ratchet 13 of a ring 14 which is coupled by means of a coupling 15 with the hub shell 16.

From inspection of FIG. 5 it can be seen that there is a toothed face 9 on the pawl carrier 11, teeth 10 being formed by an ascending face 21 and a descending face 60.

The toothed faces 8 and 9 of the ring gear 7 and pawl carrier 11, respectively, are urged against each other by a helical compression spring 33 which bears on one end upon a flange of the drive sleeve 29 and on the other end upon the pawl carrier 11.

On the ring gear 7 there is a friction ring 18 seated, and a spring 17 is adapted to slide with friction on the friction ring 18. The friction spring 17 engages in a slot of the ring 14. The function and purpose of the friction ring 18 and friction spring 17 will be explained hereinafter.

A brake member 24 which is threadedly connected by means of a flat thread 31 with the drive sleeve 29 carries another pawl mechanism the pawls of which cooperate with a ratchet 19 interiorly provided on the hub wheel 16. These pawls are not illustrated. The brake member 24 possesses a conical brake face 61 which cooperates with a conical inner face 62 of a brake sleeve 63. The brake member 24 is provided with a groove 64 which is slidingly engaged by a bent end of a clamping spring 22. The other end of this spring engages a depression 23 in the pawl carrier 11. The free-wheeling engagement at 23 acts in such a manner that it permits turning of the pawl carrier 11 relative to the brake member 24 during forward pedaling but prevents such rotational movement during backward pedaling. Between the brake sleeve 63 and the brake member 24 there is another free wheeling clamping spring connection 65 which allows the brake member 24 to turn during forward pedaling but prevents same from turning relative to the nonturning brake sleeve 63 during back pedaling.

The torque developed by the chain engaging the sprocket 1 is transmitted during forward pedaling, according to FIG. 1, over the driver member 2, the planet wheels 4, the ring gear 7, the contacting descending faces 59 and 60 of the toothed faces 8 and 9, the pawl carrier 11, the pawls 12 the ratchet 13, the ring 14, and the coupling 15 to the hub shell 16. Since the ring gear 7 rotates at a speed higher than the input speed, the transmission is set to operate at high speed.

A change in speed is effected by backward pedaling. During backward pedaling the ascending face 56 of the toothed face 8 slides over the ascending face 21 of the toothed face 9, which is due to the fact that on backward pedaling the face 9 as a part of the pawl carrier 11 is held fast with respect to the brake member 24 by the free-wheeling clamping spring 22, and the brake member 24 is held fast with respect to the brake sleeve 63 by the clamping spring 65. The ascending face 56 of the toothed face 8 slides over the immovable ascending face 21 of the toothed face 9 until the tip 58 of the tooth 20 jumps over the corresponding tip 58a of the tooth 10 and the dwell 32 of the tooth 20 is reached. The position of the faces 8 and 9 thus reached is illustrated in FIG. 6, and the position of the other hub elements thus assumed is shown in FIG. 2.

Figure 2:
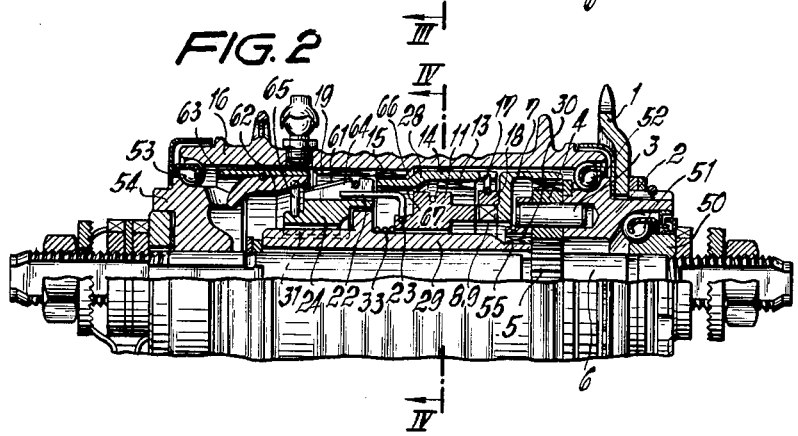
FIG. 2 shows the hub in a similar view, with the working elements of the hub set for a different speed.
Figure 4:
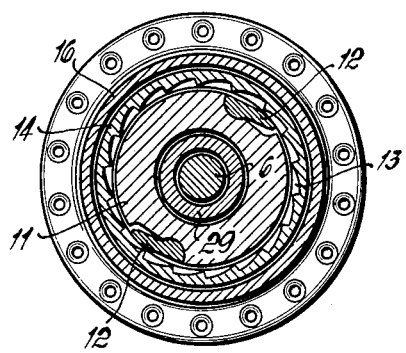
FIG. 4 is a section taken in the plane of the line IV—IV of FIG. 2.

As can be seen from FIG. 2, the relative movement of the toothed faces 8 and 9 resulted in a shift to the left of the pawl carrier 11 which is provided with the toothed face 9, when viewing toward the illustrations of FIGS. 1 and 2. This axial movement of the pawl carrier 11 results in a compression of the coil spring 33, in a movement of the pawls 12 over a conical face 66, as well as in an entry of the pawls 12 into a narrower section 67 of the bore of the ring 14. While this takes place, the pawls 12 swing from the position shown in FIG. 3 into that shown in FIG. 4, and are being thrown out of engagement with the ratchet 13 of the ring 14. The pawls 12 are no longer in a position to participate in the transmission of the torque to be derived from the bicycle chain. Instead, the transmission is now effected over pawls which are not shown, as has already been mentioned, in cooperation with the ratchet 19 of the hub shell 16. It will be appreciated that the nonillustrated pawls do not act upon the hub shell 16 during forward pedaling, that is, in the position of FIG. 1, in which position they slide along the ratchet 19.

In the position of FIG. 2, the driving torque develops from the sprocket 1 to the hub shell 16 over the driver member 2, the gear rims 30 and 55, the drive sleeve 29, the brake member 24, pawls mounted on the brake member and nonillustrated, and the ratchet 19. Thus, the hub shell is made to rotate at the same speed as the driver member 2, no transmission to a higher speed ratio being interposed. The hub shell is in direct drive. In the speed control position of FIG. 2, the pawl carrier 11 is likewise taken along by the ring gear 7, due to the cooperation of the toothed faces 8, 9 shown in FIG. 6, but the rotation of the pawl carrier 11 is without consequence since the pawls 12, as has been explained, are out of engagement with the ratchet 13.

Figure 6:
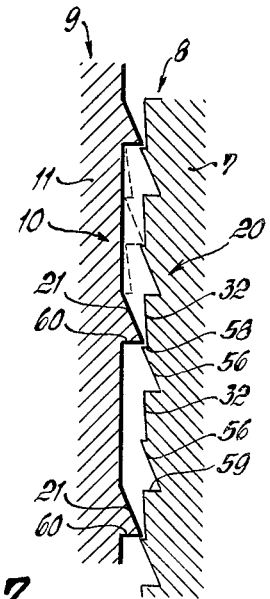
FIG. 6 shows the toothed faces in the position of FIG. 2 or in disengaged position.

A change from the speed control condition of FIGS. 1 and 6 back to the condition of FIGS. 1 and 5 is again effected by backward pedaling. The pawl carrier 11 and the toothed face 9 are again held fast over the free-wheeling engagement 23, the brake member 24, and the free-wheeling engagement 65, and the toothed face 8 of the ring gear 7 again slides across the toothed face 9 of the pawl carrier 11. The dwell 32 of the tooth 20 of the toothed face 8 moves over the tip 58a of the tooth 10 of the toothed face 9 until the tooth 10, under the force of the compressing spring 33, descends over the next face 59 of the tooth 20 of the face 8. The speed control position of FIGS. 1 and 5 is thus restored.

The braking action, too, is effected by a backward movement of the pedals. Independent of the position of the hub shell, the drive sleeve 29 will be turned backward by the driver member 2. Since the brake member 24, because of the free-wheeling clamping spring 65, does not participate in the backward turning of the drive sleeve 29, it is threadedly moved to the left until the brake cone 61 engages the hollow cone 62 of the brake sleeve 63, and the brake sleeve 63 is pressed against the hub shell 16.

A certain backward turning angle is required before the brake becomes effective. This angle depends on the axial distance between the brake cone 61 and the hollow brake cone 62, as well as on the pitch of the flat thread 31. A certain backward turning angle is also required before shifting from one speed to the next one is effected by the relative turning of the toothed faces 8 and 9 of the ring gear 7 and the pawl carrier 11, respectively.

The backward turning angles needed for braking and speed changes, respectively, may be arranged with respect to each other in such manner that braking takes place briefly after, due to backward pedaling, a shift from one speed to the next one has taken place. However, braking and speed change may be arranged in such a way as well that the brake becomes only effective after the change from one speed to the second next has occurred, that is, after the original speed position has again been resumed.

The friction ring 18 and friction spring 17 are intended to prevent that in the position of FIG. 1, on backward pushing of the bicycle following a braking action, the hub shell 16 be blocked. When in the speed control position of FIG. 1 a backward pushing takes place, there are taken along the ring 14 by the hub shell 16 over the coupling 15, the pawl carrier 11 by the ring 14 over the pawls 12, the ring gear 7 by the pawl carrier 11 over the toothed faces 9 and 8, the planet wheel carrier 2 by the ring gear 7 over the planet wheels 4, and the drive sleeve 29 by the planet wheel carrier 2 over the gearing 55, 30. The drive sleeve 29 will thus be turned backward and will cause a threaded movement of the brake member 24 toward left, that is, in the direction toward the braking position. It will be apparent that this, when braking has just been effected, will further increase the braking action and block the hub shell 16. In order to prevent this, I provide the coupling 15 between the ring 14 and hub shell 16 with some circumferential lost motion. The friction spring 17 and friction ring 18 serve to make sure that this play will always be fully available when, after braking, the hub shell 16 due to backward pushing is turned backward. During braking, that is, during the standstill of the ring gear 7 and thus of the friction ring 18, the friction spring 17 seeks to hold the ring 14, while the hub shell 16 continues to run forwardly. When, next, the hub shell is turned backward, it takes the ring 14 along only then when the entire lost motion of the coupling 15 is used up. And this means that on pushing the bicycle back, after a preceding braking action, the drive sleeve 29 first does not turn as long as the lost motion of the coupling 15 is not used up. During this time, the pawls supported on the brake member 24 engage the ratchet 19 so that the brake member 24 is given a turning movement which moves the brake member 24 threadedly from the braking position to the right and, therefore, prevents blocking.

Figure 7:
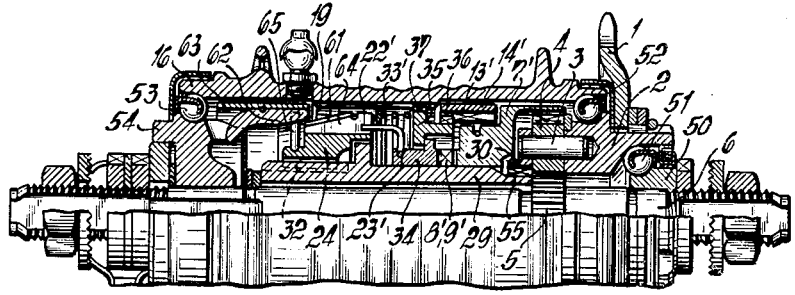
FIG. 7 shows a second embodiment in a view similar to those of FIGS. 1 and 2.

In FIG. 7 another embodiment of a dual speed wheel hub of the invention is shown. The following description deals primarily with parts and actions different from those described hereinbefore.

A ring gear 7' is formed to serve also as a pawl carrier. The pawls are not recognizable but correspond to those shown in FIG. 3. They are continuously in engagement with a ratchet 13' of a ring 14'. Between the ring 14' and the hub shell 16 there is a coupling member 35 a first series of axially extending external teeth of which engages the ratchet 13' while a second series of axially extending teeth engages internal teeth of the hub shell 16. A helical compression spring 33' bears upon the coupling member 35 which cooperates with a speed control ring 34. Toothed faces 8' and 9' are provided on the ring gear 7' and the speed control ring 34, respectively. The ring 34 is coupled with the brake member 24 by means of a free-wheeling clamping spring 22' which engages the depression 23'.

In the speed control position shown in FIG. 7, the driving torque is transmitted from the sprocket 1 to the hub shell 16 over the driver member 2, planet wheels 4, ring gear 7', pawls (not shown), ratchet 13', ring 14, gear teeth 36, coupling member 35, and gear teeth 37. The transmission is set for high speed. In the other speed control position, the torque is transmitted from the sprocket 1 over the driver member 2, gear rims 30, 55, drive sleeve 29, brake member 24, the pawl arrangement (not shown) on the brake member, and ratchet 19, in which case the drive is set for low speed. It is due to the cooperation of the toothed faces 8', 9' that the speed control ring 34 is shifted. The coupling member 35 which is simultaneously moved couples the ring 14' and hub shell 16 in the condition illustrated in FIG. 7, and uncouples ring 14' and hub shell 16 in the other speed control condition which is not shown.

FIG. 8 shows another embodiment of a dual speed wheel hub according to the invention. A pawl carrier 11" and a ring gear 7" are separate parts. The pawls of the pawl carrier 11" are in immediate engagement with the ratchet 19 of the hub wheel 16. A toothed face 8" is again provided on the ring gear 7" while a toothed face 9" is formed on a speed control and coupling ring 34". The latter engages by means of external gear teeth 36" internal gear teeth 67 of the pawl carrier 11". The ring 34" is coupled with the brake member 24 by a freewheeling clamping spring 22", 23", and the brake member 24 is coupled with the brake sleeve 63 by means of the free-wheeling clamping spring 65.

In the speed control position of FIG. 8 the torque from the sprocket 1 is sequentially transmitted to the ratchet 19 of the hub wheel 16 by the driver member 2, planet wheels 4, ring wheel 7", toothed faces 8", 9", speed control and coupling ring 34", gear teeth 36", 67 of the ring 34" and pawl carrier 11", respectively, and pawls of the pawl carrier 11".

Mutual turning of the toothed faces 8", 9", on applying reverse pressure on the pedals, shifts the speed control and coupling ring 34". In the low gear condition not illustrated, the teeth 36", 67 are disengaged. Then the transmission from the sprocket 1 to the ratchet 19 of the hub wheel 16 takes place over the driver member 2, gear rims 55, 30, drive sleeve 29, brake member 24, and pawls (not shown) carried by the brake member 24.

In the embodiment of FIG. 9, the back pedaling brake of FIGS. 1 to 6 appears replaced by a simple lock which prevents the bicycle rider from continuously back pedaling while changing speed, as does the brake of FIGS. 1 to 6. The lock of FIG. 9 consists of a locking member 68 which is threadedly connected, by means of a flat thread 31a, with the drive sleeve 29. The locking member 68 is secured in place with respect to a bearing ring 54a by a free-wheeling clamping spring 65a, similarly as the brake member 24 is secured in the embodiment of FIGS. 1 to 6. On back pedaling, the locking member 68 is threadedly moved to the left until it abuts against the bearing ring 54a. In all other respects, the embodiment of FIG. 9 is identical with that of FIGS. 1 to 6.

In the dual speed wheel hub of FIG. 10, a toothed face 8b is not provided on a ring gear that in FIG. 10 is designated 7b but on a driver member 2b which is also the planet wheel carrier. The other toothed face 9b is provided, similarly as in the case of FIG. 7, on a speed control member 34b. A pawl carrier 11b which can be shifted with the aid of the speed control member 34b cooperates as in the embodiment of FIGS. 1 to 6 with a ring 14. Again, as in the case of FIGS. 1 to 6, the ring 14 is provided with a conical surface 66 for the disengagement of the pawls of the pawl carrier 11b from the ratchet 13b. The pawl carrier 11b with its external teeth 36b is in permanent engagement with internal teeth of the ring gear 7b.

In the position shown, torque from the sprocket 1 is transmitted to the hub shell 16 over the driver member and planet wheel carrier 2b, planet wheels 4, ring wheel 7b, teeth 36b, pawl carrier 11b, pawls (not shown), ratchet 13b, ring 14, and coupling 15.

A change in speed is effected as in the embodiments so far described by backward pedaling. The toothed face 9b is secured against turning during backward pedaling, while the face 8a of the driver member 2b turns with respect to the face 9b, and the speed control member 34b is made to shift back and forth against the influence of the compression spring 33. The speed control member 34b takes the pawl carrier 11b along and brings same into a position in which the pawls, in view of the conical surface 66 of the ring 14, become ineffective. In this speed control position which is not shown, the torque develops from the sprocket 1 to the hub shell 16 over the driver member 2b, gear rims 55, 30, drive sleeve 29, brake member 24, pawls (not shown) of the brake member, and ratchet 19.

Having reference now to FIG. 11, the embodiment shown differs from the embodiments described inasmuch as the driver member is not a planet wheel carrier as well, but is integral with the ring gear. This combination driver member and ring gear is designated 40, and the planet wheel carrier 41. The latter is rotatably mounted on the shaft 6. The planet wheels 4 which are carried by bearing pins 3 of the planet wheel carrier 41 mesh with internal teeth of the driver member and ring gear combination and with the sun wheel 5. The toothed faces 8c, 9c are provided on the aforesaid combination 40 and a pawl carrier 11c, respectively. These faces cooperate with each other as has been explained hereinbefore. Engagement and disengagement of the pawls of the pawl carrier 11c takes place as in the embodiment of FIGS. 1 to 6 by coaction with the conical surface 66c of the ring 14c.

In the position shown, the transmission of the torque of the sprocket 1 to the hub shell 16 takes place over the driver member 40 which also acts as the ring gear, the faces 8c, 9c, pawl carrier 11c, pawls (not shown) of the pawl carrier, ratchet 13c, ring 19c, and coupling 15c. The transmission is direct, with no change in speed interposed.

In the nonillustrated other speed control position, the pawl carrier 11c, due to the mutual turning of the toothed faces 8c, 9c, is shifted to the left, and the pawls of the pawl carrier 11c are disengaged from the ratchet 13c. The transmission of power flows now from the sprocket 1 to the hub shell 16 over the part 40, planet wheels 4, planet wheel carrier 41, teeth 30, 55, drive sleeve 29, brake member 24, pawls (not shown) on the brake member 24, and the ratchet 19c. The planet wheel carrier 41 turns at a lower speed than the part 40 so that there is a speed differential. The hub is operated at a speed lower than the input speed.

FIG. 12 shows a modification of the embodiment of FIG. 11. The hub shown is again to be operated in direct and low gear. Driver member and ring gear are again combined to form part 40.

Toothed faces 8d, 9d are provided on a planet wheel carrier 41d and a speed control member 34d, respectively. In the position shown in FIG. 12, the torque flows from the sprocket 1 to the hub shell 16 over the driver member and ring gear combination 40, gear teeth 36d, pawl carrier 11d, the pawls of the pawl carrier, the ring 14d, and coupling 15d.

When changing the speed by backward pedaling, the speed control member 34d is secured against turning by means of the free-wheeling clamping springs 22d, 23d and 65. The toothed face 8d turns relative to the stationary toothed face 9d and shifts the latter to the left. The speed control member 34d pushes the pawl carrier 11d to the left, and the pawls of the pawl carrier 11d engage the conical face 66 and disengage the ratchet 13d.

In the nonillustrated low speed condition, the torque transmission from the sprocket 1 to the hub shell 16 occurs over the driver member and ring gear combination 40, planet wheels 4, planet wheel carrier 41d, teeth 30, 55, drive sleeve 29, brake member 24, pawls of the brake member, and ratchet 19d.

It is believed that the construction and operation of the forms of the dual speed hub of my invention, as illustrated and described hereinbefore, and the many advantages thereof, will be fully understood from the foregoing detailed description. In briefly reviewing the principles of the invention, it is pointed out that normally the two toothed faces which are under the influence of a spring force engage each other axially. During forward pedaling, they serve as two cooperating power-transmitting elements. On rotation of the driver member backward, however, a hub element which is provided with one of the toothed faces comes to a standstill. The other toothed face continues to rotate and imparts a lateral shift to the no longer rotating hub element. Depending on the position of the two toothed faces with respect to each other and the position of the hub element which either rotates or does not rotate but is moved axially, the transmission of torques takes place in either one of two ways.

The following table indicates further embodiments of the invention in addition to those already dealt with.

*Dual speed hubs with or without coaster brake and with two optional transmission elements and back pedaling speed change*

| Kind of engagement and disengagement of transmission elements | Dual speed hub with fast and direct gear | | Dual speed hub with slow and direct gear | |
|---|---|---|---|---|
| | Axially movable toothed face on— | | | |
| | Ring gear | Planet wheel carrier | Ring gear | Planet wheel carrier |
| Disengagement of pawls from ratchet. | Figs. 1, 2, 9 (Solution 1) | Fig. 10 (Solution 4) | Fig. 11 (Solution 7) | Fig. 12 (Solution 10). |
| Engagement and disengagement of coupling between ring and hub shell. | Fig. 7 (Solution 2) | (Solution 5 not shown) | (Solution 8 not shown) | (Solution 11 not shown). |
| Engagement and disengagement of coupling between planetary gearing and transmission elements. | Fig. 8 (Solution 3) | (Solution 6 not shown) | (Solution 9 not shown) | (Solution 12 not shown). |

While the aforeindicated solutions 1, 4, 7, and 10 include a pawl and ratchet mechanism, the solutions 2, 3, 5, 6, 8, 9, 11, and 12 permit the use of any kinds of transmission elements.

The foregoing table is intended to make clear that while I have shown and described my invention in a few forms only many changes and modifications may be made without departing from the spirit of the invention defined in the appended claims.

I claim:
1. A dual speed hub for bicycles, motorcycles, and the like, comprising:
 (a) a stationary shaft having an axis;
 (b) a driver member rotatable about said shaft in forward and backward directions;
 (c) a hub shell supported to extend coaxially with said shaft for rotation about said axis in said forward and backward directions;
 (d) power transmission elements between said driver member and said hub shell, said elements including
   (1) planetary gearing means,
   (2) a first and second toothed face, said faces being adapted to engage each other axially,
   (3) compression spring means for urging said toothed faces into axial driving engagement during rotation of said driver member in said forward direction,
   (4) first and second element means, said first element means and said first toothed face being arranged to rotate during rotation of said driver member in said forward and backward directions, said second element means and said second toothed face being arranged to rotate during rotation of said driver member in said forward direction while in a first position, but to come to a standstill and to move to a second position in response to rotation of said driver member in said backward direction, said toothed faces being out of engagement when said second element means and said second toothed face are in said second position, and
   (5) two groups of elements to be optionally included in the power transmission in response to the relative position assumed by said second element and said second toothed face; and
 (e) a coaster brake assembly including
   (1) a drive sleeve connected to said drive member for rotation about said shaft,
   (2) a brake member threadedly connected to said drive sleeve,
   (3) a free-wheeling clutch preventing said brake member from turning during rotation of said driver member in said backward direction, and
   (4) another free-wheeling clutch preventing said second toothed face from turning during rotation of said driver member in backward direction, said other free-wheeling clutch being operatively connected to said brake member.

2. A dual speed hub for bicycles, motorcycles, and the like, comprising:
 (a) a stationary shaft having an axis;
 (b) a driver member rotatable about said shaft in forward and backward directions;
 (c) a hub shell supported to extend coaxially with said shaft for rotation about said axis in said forward and backward directions;
 (d) power transmission elements between said driver member and said hub shell, said elements including
   (1) planetary gearing means,
   (2) a first and second toothed face, said faces being adapted to engage each other axially,
   (3) compression spring means for urging said toothed faces into axial driving engagement during rotation of said driver member in said forward direction,
   (4) first and second element means, said first element means and said first toothed face being arranged to rotate during rotation of said driver member in said forward and backward directions, said second element means and said second toothed face being arranged to rotate during rotation of said driver member in said forward direction while in a first position, but to come to a standstill and to move to a second position in response to rotation of said driver member in said backward direction, said toothed faces being out of engagement when said second element means and said second toothed face are in said second position, and
   (5) two groups of elements to be optionally included in the power transmission in response to the relative position assumed by said second element and said second toothed face; and (e) a locking arrangement including
   (1) a drive sleeve connected to said driver member for rotation about said shaft,
   (2) a locking member threadedly connected to said drive sleeve,
   (3) a free-wheeling clutch preventing said locking member from turning during backward rotation of said drive sleeve, and
   (4) another free-wheeling clutch preventing said second toothed face from turning during said backward rotation of the drive sleeve, said other free-wheeling clutch being operatively connected to said locking member.

3. A duel speed hub for bicycles, motorcycles, and the like, comprising:
   (a) a stationary shaft having an axis;
   (b) a driver member rotatable about said shaft in forward and backward directions;
   (c) a hub shell supported to extend coaxially with said shaft for rotation about said axis in said forward and backward directions; and
   (d) power transmission element between said driver member and said hub shell, said elements including
      (1) planetary gearing means,
      (2) a first and second toothed face, said faces being adapted to engage each other axially,
      (3) compression spring means for urging said toothed faces into axial driving engagement during rotation of said driver member in said forward direction,
      (4) first and second element means, said first element means and said first toothed face being arranged to rotate during rotation of said driver member in said forward and backward directions, said second element means and said second toothed face being arranged to rotate during rotation of said driver member in said forward direction while in a first position, but to come to a standstill and to move to a second position in response to rotation of said driver member in said backward direction, said toothed faces being out of engagement when said second element means and said second toothed face are in said second position,
      (5) two groups of elements to be optionally included in the power transmission in response to the relative position assumed by said second element and said second toothed face,
      (6) one of said groups of elements being adapted to be included in, and excluded from, the power transmission, the other of said groups of elements being bypassed when the first group is included in the power transmission, and drivingly connected in the power transmission when the first group is excluded,
      (7) a pawl and ratchet mechanism forming said first group of elements,
      (8) a ring included in said mechanism and provided with the ratchet,
      (9) a clutch with circumferential lost motion, said ring being coupled with said hub shell by said clutch,
      (10) a friction ring, and
      (11) a friction spring between said ring and friction ring, said friction spring being effective so that upon a standstill of said friction ring on braking and on transition from braking to rearward pushing of a vehicle equipped with said hub the whole of said lost motion is freely gone through.

4. A dual speed hub for bicycles, motorcycles, and the like, comprising:
   (a) a stationary shaft having an axis;
   (b) a driver member rotatable about said shaft in forward and backward directions;
   (c) a hub shell supported to extend coaxially with said shaft for rotation about said axis in said forward and backward directions; and
   (d) power transmission elements between said driver member and said hub shell, said elements including
      (1) planetary gearing means, said driver member constituting a planet wheel carrier of said planetary gearing means,
      (2) a first toothed face on said planet wheel carrier and a second toothed face, said faces being adapted to engage each other axially,
      (3) compression spring means for urging said toothed faces into axial driving engagement during rotation of said driver member in said forward direction,
      (4) first and second element means, said first element means and said first toothed face being arranged to rotate during rotation of said driver member in said forward and backward directions, said second element means and said second toothed face being arranged to rotate during rotation of said driver member in said forward direction while in a first position, but to come to a standstill and to move to a second position in response to rotation of said driver member in said backward direction, said toothed faces being out of engagement when said second element means and said second toothed face are in said second position, and
      (5) two groups of elements to be optionally included in the power transmission in response to the relative position assumed by said second element and said second toothed face.

References Cited by the Examiner
UNITED STATES PATENTS

| | | | |
|---|---|---|---|
| 1,233,600 | 7/17 | Olsen | 74—740 |
| 2,953,945 | 9/60 | Gleasman | 74—750 |
| 3,057,227 | 10/62 | Schwerdhofer | 74—750 |

DON A. WAITE, *Primary Examiner.*